UNITED STATES PATENT OFFICE.

JOHANN G. BIERICH, OF MENKENHOF, NEAR LIEVENHOF, RUSSIA.

MANUFACTURE OF MEAL FROM RAW HORN OR THE LIKE.

SPECIFICATION forming part of Letters Patent No. 718,597, dated January 20, 1903.

Application filed October 20, 1902. Serial No. 128,064. (No specimens.)

*To all whom it may concern:*

Be it known that I, JOHANN G. BIERICH, a subject of the Emperor of Russia, and a resident of Menkenhof, near Lievenhof, Russia, have invented certain new and useful Improvements in the Manufacture of Meal from Raw Horn or the Like, suitable for the production of a homogeneous horn substance; and I do hereby declare the following to be a full, clear, and exact description of the invention, such as will enable others skilled in the art to which it appertains to make and use the same.

My invention relates to the production from raw horn, hoof, or similar waste (hereinafter referred to as "horn") of horn-meal adapted for the manufacture therefrom of a homogeneous horn substance.

Hitherto horn waste has not in practice been reduced to a state of fine powder or meal by a purely mechanical process, for the reason that the horn in its raw state wears away the grinding-stone of the mills to such an extent that fine particles of stone in injurious quantities become mixed with the horn-meal produced. Horn-meal produced from horn waste which has been subjected to a preliminary steaming, boiling, or the like process does not contain certain natural characteristics of raw horn and is therefore unsuitable for the purposes in view. Artificial horn substances produced from horn or horn waste which has been subjected to a preliminary chemical treatment are of little or no value even if almost free from stone particles, as it is found to so rapidly absorb moisture as to be incapable of resisting even slight atmosphere influence.

Now this invention has for object to obviate the aforesaid disadvantages by producing by purely mechanical means horn-meal from raw-horn waste. According thereto raw-horn waste, freed, if necessary, from impurities by washing and dried, is subjected to a preliminary grinding process in a suitable mill—as, for example, a Carr's disintegrator—and the fine particles of horn separated therefrom by passing through a sieve having thirty-six meshes or more to the square centimeter, after which the so-sifted material is subjected to a further grinding between stones that are least liable to be affected by wear and tear. Of various natural and artificial stones that have been experimented with the one so far found to give satisfactory results is that known as "French artificial stone" and manufactured by the firm of Morill in Nuremberg, Germany. For washing the horn either cold or warm water may be used, and it may be sun or air dried. The preliminary grinding process yields only such very small quantities of fine horn-meal as to be quite insufficient for the manufacture therefrom on a large scale of a homogeneous horn substance according to this invention. Moreover, the continuation of this preliminary trituration beyond a certain point does not yield any further material quantity of fine horn-meal. Hence the necessity for the further grinding process. After the preliminary grinding and before the further grinding the sieved material is freed by the aid of magnets from any particles of iron—such, for example, as nails—which it may contain. The coarse residue remaining on the sieve is again treated in the first mill and subsequently sieved as before, and so on. Owing to the predetermined and uniform state of granulation of the material resulting from the preliminary sifting, it results that the grinding along with the meal of stone particles is, practically speaking, entirely avoided and a pure raw-horn meal obtained. Now in order to make the so-produced meal suitable for the subsequent manufacture therefrom of a homogeneous horn substance the percentage of moisture withdrawn from the meal by the drying and by the disintegration is wholly or partially mechanically returned to it after the second grinding process by moistening as equally as possible with a fine spray of water, and before pressing the percentage of fat may also in some cases be made good by injecting a small quantity of fat, (oil, train-oil, &c., which may be introduced along with the water in the form of fine spray,) and particularly when it is desired that the horn substance to be made should be more or less supple.

The amounts of water and fat that require to be added to the meal, as above referred to, are judged by the feel of the meal and may vary considerably in meal produced from different kinds of waste.

Having thus described my invention, what I claim as new therein, and desire to secure by

Letters Patent of the United States of America, is—

1. The process of making raw-horn meal from horn waste, which consists in cleaning the waste, drying it, subjecting it to a preliminary grinding, removing any metallic particles that may be present, and then subjecting the meal to a second grinding, substantially as and for the purpose set forth.

2. The process of making raw-horn meal from horn waste, which consists in cleaning the waste, drying it, subjecting it to a preliminary grinding, removing any metallic particles, subjecting it to a second grinding and moistening the meal, substantially as and for the purposes set forth.

3. The process of making raw-horn meal from horn waste, which consists in cleaning the waste, drying it, subjecting it to a preliminary grinding, removing any metallic particles, grinding it again, moistening the meal, and spraying it with oil to render the product flexible, substantially as and for the purpose set forth.

In testimony that I claim the foregoing as my invention I have signed my name in presence of two subscribing witnesses.

J. G. BIERICH.

Witnesses:
    VURDICHMANN,
    J. WEISS.